(12) United States Patent
Nilsen et al.

(10) Patent No.: US 7,569,175 B1
(45) Date of Patent: Aug. 4, 2009

(54) CONTAINER PRODUCTION PROCESS

(75) Inventors: Jorunn Nilsen, Stathelle (NO); Svein Eggen, Stathelle (NO); Lars Thorn, Stathelle (NO); Hege Vale Baann, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 561 days.

(21) Appl. No.: 10/049,879

(22) PCT Filed: Aug. 15, 2000

(86) PCT No.: PCT/GB00/03149

§ 371 (c)(1),
(2), (4) Date: May 30, 2002

(87) PCT Pub. No.: WO01/14122

PCT Pub. Date: Mar. 1, 2001

(30) Foreign Application Priority Data

Aug. 19, 1999 (GB) ................................. 9919718.8

(51) Int. Cl.
*B29C 39/02* (2006.01)
*B29D 22/00* (2006.01)
*C08L 23/00* (2006.01)

(52) U.S. Cl. ..................... 264/523; 428/35.7; 428/36.9; 428/36.92; 525/240

(58) Field of Classification Search ................. 264/523; 428/36.9
See application file for complete search history.

(56) References Cited

U.S. PATENT DOCUMENTS

| 4,336,352 | A |   | 6/1982  | Sakurai et al. |
| 4,391,128 | A | * | 7/1983  | McWhorter ..................... 73/38 |
| 4,550,143 | A |   | 10/1985 | Tanaka et al. |
| 4,617,352 | A | * | 10/1986 | Page et al. .................. 525/240 |
| 5,189,106 | A | * | 2/1993  | Morimoto et al. ........... 525/240 |
| 5,350,807 | A |   | 9/1994  | Pettijohn et al. |
| 5,409,646 | A | * | 4/1995  | Menon et al. .................. 264/28 |
| 5,494,965 | A | * | 2/1996  | Harlin et al. ................... 525/52 |
| 5,539,076 | A | * | 7/1996  | Nowlin et al. ............. 526/348.1 |
| 5,648,439 | A |   | 7/1997  | Bergmeister |
| 6,090,893 | A | * | 7/2000  | Harlin et al. ................. 525/240 |
| 6,126,033 | A | * | 10/2000 | Suttoni ........................ 220/634 |
| 6,221,982 | B1 | * | 4/2001 | Debras et al. .................. 526/64 |
| 6,403,181 | B1 | * | 6/2002 | Barry et al. ................. 428/36.9 |
| 6,485,662 | B1 | * | 11/2002 | Neubauer et al. ........... 264/169 |
| 6,552,150 | B1 | * | 4/2003 | Nummila-Pakarinen et al. . 526/352 |
| 6,709,718 | B2 | * | 3/2004 | O'Brien ....................... 427/538 |
| 7,193,018 | B2 | * | 3/2007 | Jacob et al. .................. 525/191 |

FOREIGN PATENT DOCUMENTS

| EP | A-100843       | 7/1984  |
| EP | A-129312       | 8/1985  |
| EP | A-273284       | 7/1988  |
| EP | 302242         | 8/1989  |
| EP | 0 339 571 A1   | 11/1989 |
| EP | 398350         | 11/1990 |
| EP | A-0492656      | 7/1992  |
| EP | 0 503 791 A1   | 9/1992  |
| EP | A-0603935      | 6/1994  |
| EP | 0 757 076 A1   | 2/1997  |
| EP | 0 778 289 A1   | 6/1997  |
| EP | A-778289       | 6/1997  |
| EP | A-992539       | 4/2000  |
| GB | 1174542        | 12/1969 |
| JP | 6-172594       | 6/1994  |
| JP | 11-080259      | 3/1999  |
| WO | WO 92/12182 A1 | 7/1992  |
| WO | WO 95/11264 A1 | 4/1995  |
| WO | WO 97/42237 A1 | 11/1997 |
| WO | WO 97/47682 A1 | 12/1997 |
| WO | WO 99/03899 A1 | 1/1999  |
| WO | WO 99/40126 A1 | 8/1999  |
| WO | WO 01/23446    | 4/2001  |

OTHER PUBLICATIONS

Polymer Testing '97, Shrewsbury (UK)—1997, Chemical Analysis vol. 3, paper 8, pp. 1-4, Steve Holding 'Polymer Molecular Weight Determination'.
European Plastics News, Dec. 1998, Blow Moulding, Plastic Fuel Tanks, Making the Grade.
Modern Plastics International, Apr. 1996, pp. 38-39.

* cited by examiner

*Primary Examiner*—Jeffrey Wollschlager
(74) *Attorney, Agent, or Firm*—Nixon & Vanderhye P.C.

(57) ABSTRACT

Medium to large volume containers having improved environmental stress crack resistance are blow moulded from bimodal high density polyethylene.

3 Claims, No Drawings

CONTAINER PRODUCTION PROCESS

This is a national stage application under 35 U.S.C. 371 of PCT/GB00/03149 filed on Aug. 15, 2000 and which claims priority to GB 9919718.8 filed on Aug. 19, 1999.

BACKGROUND OF THE INVENTION

This invention relates to improvements in and relating to the production of containers by blow moulding of a polymer material, in particular a high density polyethylene (HDPE).

In the production of containers using polymer materials, a variety of moulding techniques may be used, in particular blow moulding, slush moulding, injection moulding and rotational moulding. For very large containers, e.g. for use as oil or water tanks, rotational moulding is a preferred technique; however for medium to large sized containers, e.g. 8 to 250 L volume, blow moulding is commonly used.

Generally in the blow moulding of containers a heated parison or extrudate is expanded to contact the interior surface of a mould by the action of pressurized gas within the parison and/or by application of a partial vacuum within the mould, e.g. by use of a mould having within its surface gas outlet vents through which a partial vacuum may be applied.

For blow moulding to be successful, the heated polymer must be able to stretch smoothly to produce a satisactorily uniform skin in contact with the mould surface.

In the production of containers by blow moulding of polyethylene, the polymer used has typically been a high molecular weight (HMW) high density polyethylene (HDPE), generally with a melt flow rate ($MFR_{21}$) in the range 2 to 12 g/10 min. Such materials may be produced for example by chromium-catalysed ethylene polymerization. However the choice of such materials essentially represents a compromise between the properties of the polymer, in particular the processability properties required for the blow moulding to be performed efficiently and successfully and the mechanical and chemical properties required for the end uses of the blow moulded containers, e.g. impact resistance, stiffness, and environmental stress crack resistance (ESCR).

SUMMARY OF THE INVENTION

We have now found that large volume blow moulded containers which have excellent ESCR properties may be produced if one uses a high density polyethylene (HDPE) comprising at least two polyethylene components having different molecular weight distributions wherein at least one of said components is an ethylene copolymer. Such HDPE is referred to hereinafter as bimodal.

Thus viewed from one aspect the invention provides a process for the preparation of an at least 2 L (e.g. 2 to 1000 L, preferably 2 to 250 L, more preferably 8 to 230 L, still more preferably 30 to 225 L) volume polyethylene container which process comprises blow moulding a bimodal HDPE.

In the process of the invention, the parison is conveniently part-blown before the mould is closed, the mould is then closed and the blowing of the parison is completed.

DETAILED DESCRIPTION OF THE INVENTION

By polyethylene is meant a polymer the majority by weight of which derives from ethylene monomer units. While the different polyethylene components of the bimodal HDPE may all be ethylene copolymers, and while an ethylene homopolymer may be one of the components, the polyethylene components cannot all be ethylene homopolymers. Where one component is an ethylene homopolymer, this is preferably the component with the lower weight average molecular weight (Mw) and its Mw is preferably 5000 to 100000 D, more preferably 20000 to 40000 D. In the ethylene copolymer components, comonomer contributions, e.g. up to 20% by weight more preferably up to 10% by weight, may derive from other copolymerizable monomers, generally $C_{3-20}$, especially $C_{3-10}$, comonomers, particularly singly or multiply ethylenically unsaturated comonomers, in particular $C_{3-10}$ α-olefins such as propene, but-1-ene, hex-1-ene, etc. (The term ethylene copolymer is used herein to relate to a polyethylene deriving from ethylene and one or more such copolymerizable comonomers). Moreover, the polyethylene may contain minor, e.g. up to 10% by weight, preferably up to 5% by weight of other polymers, e.g. other polyolefins in particular polypropylenes, as well as additives such as plasticizers, colours, fillers, radiation stabilizers, antioxidants, etc., generally in amounts up to 10% by weight, preferably up to 5% by weight.

By HDPE is meant a polyethylene having a density of 940 to 980 kg/m$^3$, preferably 945 to 975 kg/m$^3$, more preferably 945 to 960 kg/m$^3$, and a crystallinity of 60 to 95%, preferably 70 to 90%.

The HDPE used according to the invention is a bimodal or multimodal polymer. By bimodal (or multimodal), it is generally meant that the polymer consists of at least two fractions (components), one of which has a relatively low molecular weight and a relatively high density and another of which has a relatively high molecular weight and a relatively low density. Typically the molecular weight distribution (MWD) of a polymer produced in a single polymerization stage using a single monomer mixture, a single polymerization catalyst and a single set of process conditions (i.e. temperature, pressure etc.) will show a single maximum, the breadth of which will depend on catalyst choice, reactor choice, process conditions, etc, i.e. such a polymer will be monomodal.

A bimodal or multimodal polyethylene may be produced by blending two or more monomodal polyethylenes having differently centred maxima in their MWDs. Alternatively and preferably the bimodal polyethylene may be produced by polymerization using conditions which create a bimodal or multimodal polymer product, e.g. using a catalyst system or mixture with two or more different catalytic sites, using two or more stage polymerisation process with different process conditions in the different stages (e.g. different temperatures, pressures, polymerisation media, hydrogen partial pressures, etc). (See EP-A-778289)

Such a bimodal (or multimodal) HDPE may be produced relatively simply by a multistage ethylene polymerization, e.g. using a series of reactors, with comonomer addition in only the reactor(s) used for production of the higher/highest molecular weight components). Examples of bimodal PE production are given in EP-A-778289 and WO92/12182.

If an ethylene homopolymer component is produced by slurry polymerization involving use of recycled diluent, that diluent may contain small amounts of higher α-olefins as contaminants. Likewise where an earlier polymerization stage has produced an ethylene copolymer component, small amounts of comonomer may be carried over to an ethylene homopolymerization stage. Accordingly, by ethylene homopolymer is meant herein a polymer containing at least 99.9% by weight of ethylene units. Likewise as in a multistage/multireactor polymerization using more than one catalyst system, the homopolymerization catalysts may be at least partially active during the copolymerization reaction, any copolymer component making up less than 5% by weight of the total polymer shall not be considered to be the lowest molecular weight component in an HDPE according to the invention.

The copolymer component(s) of the HDPE used according to the invention will generally contain at least 0.1% by weight, preferably at least 0.5% by weight of non-ethylene monomer units, e.g. 0.5 to 6% of such comonomer units.

The polymerization reactions used to produce the HDPE of the invention may involve conventional ethylene homopolymerization or copolymerization reactions, e.g. gas-phase, slurry phase, liquid phase polymerizations, using conventional reactors, e.g. loop reactors, gas phase reactors, batch reactors etc. (see for example WO97/44371 and WO96/18662). The catalyst systems used may likewise be any conventional systems, e.g. chromium catalysts, Ziegler-Natta and metallocene or metallocene:aluminoxane catalysts, either homogeneous or more preferably heterogeneous catalysts, e.g. catalysts supported on inorganic or organic particulates, in particular on magnesium halides or inorganic oxides such as silica, alumina or silica-alumina. For the preparation of the high molecular weight component in particular it is especially desirable to use supported Ziegler-Natta catalysts as the molecular weight can then conveniently be controlled using hydrogen. It is also possible to use supported metallocene catalysts as it is particularly straightforward to select desired molecular weights by appropriate selection of particular metallocenes. The metallocenes used will typically be group IVa to VIa metals (in particular Zr or Hf) complexed by optionally substituted cyclopentadienyl groups, e.g. groups carrying pendant or fused substituents optionally linked together by bridging groups. Suitable metallocenes and aluminoxane cocatalysts are widely described in the literature, e.g. the patent publications of Borealis, Hoechst, Exxon, etc.

Typically however the HDPE will be prepared using multistage polymerization using a single catalyst system or a plurality of catalyst systems, e.g. two or more metallocenes, one or more metallocenes and one or more Ziegler-Natta catalysts, two or more chromium catalysts, one or more chromium catalysts and one or more Ziegler-Natta catalysts, etc.

The use of bimodal HDPE in the production of relatively large, i.e. 2 to 1000 L, e.g. 2 to 250 L, preferably 8 to 240 L, more preferably 20 to 230 L, and still more preferably 30 to 225 L, containers results in surprisingly increased values for ESCR. Thus for example tests comparing containers made using conventional monomodal HDPE with bimodal HDPE have shown an increase in ESCR $F_{50}$ from 250 hours to over 1000 hours. (ESCR $F_{50}$ is measured as the time taken for 50% of samples to be broken when bent and contained in a detergent solution. The test is a standard one categorised as ESCR, ASTM D-1693 condition B, 10% Igepal). Such $F_{50}$ values for relatively large containers are particularly surprising in view of the relatively low $F_{50}$ values (ca. 400 h) achieved for small (0.45 L) containers using blow-moulding of bimodal HDPE in EP-A-778289.

The bimodal HDPE used in the process of the invention preferably has the following characteristics Density: 940 to 970, preferably 945 to 960 kg/m$^3$;

Weight Average Molecular Weight (Mw): 200000 to 450000, preferably 250000 to 350000 Dalton;

Number Average Molecular Weight (Mn): 6000 to 20000, preferably 7000 to 18000 Dalton;

$MFR_{21}$: 2 to 12 g/10 min, preferably 3 to 8 g/10 min;

Molecular Weight Distribution (i.e. Mw/Mn): 15 to 55, preferably 18 to 50;

Tensile Modulus: at least 900 mPa;

Comonomer Content: 0.5 to 10% wt, preferably 1 to 2 wt %.

$MFR_2$ and $MFR_{21}$ are routinely measured according to ISO 1133 at 190° C. under 2.16 and 21.6 kg loads respectively. Tensile modulus may be measured according to ISO 527.2.

Bimodal HDPE having such characteristics may be prepared by the technique described in EP-B-517868 or by conventional use of Ziegler Natta, metallocene or chromium catalysts. Especially preferably the bimodal HDPE is produced using a series of two or more reactors, in particular a loop reactor followed by one or more gas phase reactors, preferably using a Ziegler-Natta polymerization catalyst.

The polymer used according to the invention preferably contains a high molecular weight component (e.g. with a molecular weight tail of about 5000000 Daltons) to increase melt strength of the HDPE composition under elongational deformation. This can be achieved in one of several ways, e.g.

(i) produce the HDPE in a multistage polymerization in which reactor conditions are set such that a very high molecular weight component is produced in one stage, e.g. by performing one reaction stage in the absence of chain terminating hydrogen, by selection of a catalyst system which produces a high molecular weight polyethylene, by use of polyenic comonomers (e.g. dienes) which produce long chain branching or otherwise promote production of a high molecular weight fraction; or (ii) crosslinking of a polymer by timed addition of crosslinking agents in the extruder whereby to tailor-make a high molecular weight grade (i.e. to add a HMW "tail" to the polymer).

Viewed from a further aspect the invention provides a blow-moulded binded HDPE container having a volume of at least 2 L (preferably 8 to 240 L, etc), and an ESCR $F_{50}$ of at least 500 hours, preferably at least 800 hours, more preferably 1000 hours, e.g. 1000 to 2000 hours.

The containers of the invention may be produced in conventional blow-moulding apparatus.

It will be appreciated therefore that the containers of the invention may be produced without loss of the impact strength or ESCR properties using faster than normal blowing rates, i.e. with more efficient and economical usage of the blow moulding apparatus.

The containers of the invention may be used indoors or out of doors for storing gases, liquids or solids, especially liquids such as water, glues, solvent-based soaps, paints, varnishes, chemical solutions, oils and other liquid chemicals. The containers may be open (e.g. tanks, basins, etc) or may be closed, for example with lids or caps or inlet or outlet ducts.

The invention will now be described further with reference to the following non-limiting Examples.

EXAMPLE 1

Catalyst Preparation 8.6 g (66.4 mmol) of 2-ethyl-1-hexanol was added slowly to 27.8 g (33.2 mmol) of 19.9% butyl-octyl-magnesium. The temperature was kept below 35° C.

3.7 g (1.0 mmol/g carrier) of 20% EADC (ethyl aluminium dichloride) was added to 5.9 g of Sylopol 5510 silica/MgCl$_2$ carrier and the mixture was stirred for 1 hour at 30° C. 5.7 g (0.9 mmol/g carrier) of the 2-ethyl-1-hexanol/butyl-octyl-magnesium complex was added and the mixture was stirred for 5 hours at 45° C. 0.6 g (0.55 mmol/g carrier) of TiCl$_4$ was added and the mixture was stirred for 5 hours at 45° C. The catalyst was dried at 45-80° C. for 3 hours.

EXAMPLE 2

Bimodal HDPE Polymer Preparation

Ethylene, propane and hydrogen were introduced at 2.4 kg/hour, 25 kg/hour and 1 g/hour respectively into a 50 dm³ slurry loop reactor operated at 85° C. and 65 bar. The catalyst of Example 1 was introduced at a rate sufficient to produce polyethylene (PE) at about 1.9 kg PE/hour. The $MFR_2$ and density of the PE product were estimated to be about 10 g/10 min and 970 kg/m³ respectively. The slurry was withdrawn continuously and introduced into a second loop reactor of volume 500 dm³, operating at 95° C. and 61 bar. Additional ethylene, propane and hydrogen were added to produce a PE of $MFR_2$ 330 g/10 min and density 974 kg/m³ at 30 kg PE/hour. The polymer, which contained the active catalyst, was continuously withdrawn, separated from the reaction medium and transferred to a gas phase reactor. Here additional ethylene, hydrogen and 1-butene comonomer were added to produce a PE of $MFR_{21}$ 7.3 g/10 min and density 949 kg/m³ at 69 kg PE/hour. The low MW (high MFR) fraction thus represented 45% of the total polymer.

EXAMPLE 3

Bimodal HDPE Polymer Production

Polymerization was effected as in Example 2 except that 36 kg PE/hour was formed in the second loop reactor, 77 kg PE/hour was formed in the gas phase reactor and the $MFR_{21}$ and density of the final PE were 3.3 g/10 min and 952 kg/m³ respectively. The low MW (high MFR) fraction represented 48% of the total polymer.

EXAMPLE 4

Bimodal HDPE Polymer Production

Ethylene, propane and hydrogen were introduced into a 50 dm³ slurry loop reactor operating at 80° C. and 65 bar at 2.0 kg/hour, 28 kg/hour and 1 g/hour respectively. A catalyst according to Example 3 of EP-B-688794 was added to produce PE at a rate of 1.6 kg PE/hour. The $MFR_2$ and density of the PE were estimated to be about 10 g/10 min and 970 kg/m³ respectively. The slurry was continuously withdrawn and introduced into a second loop reactor of 500 dm³ volume operating at 95° C. and 61 bar. Additional ethylene, propane and hydrogen were added so that the second loop reactor produced PE at a rate of 34 kg PE/hour with $MFR_2$ and density of 55 g/10 min and 970 kg/m³ respectively. PE polymer, containing the active catalyst, was withdrawn continuously from the second loop reactor, separated from the reaction medium and transferred to a gas phase reeactor where additional ethylene, hydrogen and 1-butene comonomer were added such that PE was produced at 70 kg PE/hour with $MFR_{21}$ and density of 6.9 g/10 min and 948 kg/m³ respectively. The fraction of low MW (high MFR) polymer was thus 50%.

EXAMPLE 5

Bimodal HDPE Polymer Production

Polymerization was effected as in Example 4 except that 38 kg PE/hour and 78 kg PE/hour were formed in the second loop reactor and the gas phase reactor respectively. The final PE had $MFR_{21}$ and density of 7.3 g/10 min and 948 kg/m³ respectively and the low MW fraction was 50%.

EXAMPLE 6

Blow Moulding

30 L containers were blow moulded on a Krupp Kautex KB50 blow moulding machine at an extruder temperature of 210° C. using the HDPE polymers of Examples 2 to 5. The containers were pre-stored at 42° C. for 3 weeks containing n-butyl acetate. The n-butyl acetate was replaced with ethylene glycol and the containers were cooled to −20° C. within 24 hours and drop-tested at −20° C. using the test method of ASTM 2463-90, giving values of 2 to 3.25 m. The ESCR $F_{50}$ values were also determined using ASTM D1693, condition B.

EXAMPLE 7

Polymer Properties

The measured properties of the polymers of Examples 2 to and a comparison PE prepared using a chromium based catalyst are set out in Table 1 below. The comparison PE is commercially available as HE8214 from Borealis AS.

| Property | Example 2 | Example 3 | Example 4 | Example 5 | HE 8214 |
|---|---|---|---|---|---|
| $MFR_{21}$ (g/10 mm) | 7.3 | 3.3 | 6.9 | 7.3 | 2.7 |
| Density (kg/m³)* | 948.5 | 951.5 | 947.9 | 948 | 950.4 |
| Mw | 260000 | 370000 | 305000 | 316000 | 345000 |
| Mn | 8300 | 7700 | 12000 | 16000 | 16000 |
| MWD | 31 | 48 | 25 | 20 | 22 |
| Tensile Modulus (mPa)† | 920 | 1030 | 920 | 910 | 1065 |
| ESCR F50 (hours) | 542 | >1000 | >1000 | >1000 | 391 |
| Comonomer | 1-butene | 1-butene | 1-butene | 1-butene | 1-hexene |
| Comonomer content (% wt) | 1.8 | 1.1 | 1.4 | 1.2 | <0.1 |

*ISO 1183
†ISO 527-2

The invention claimed is:

1. A process for the preparation of an at least 8L volume bimodal HDPE container having an ESCR $F_{50}$ of at least 1000 hours which process comprises blow moulding a bimodal HDPE, wherein said bimodal HDPE consists of, as the polymer component of the container, an ethylene homopolymer having a weight average molecular weight of 40,000 to 100,000 D and ethylene copolymer and has the following characteristics:
   a density of 940 to 960 kg/m³;
   a weight average molecular weight of 200000 to 450000 D;
   a number average molecular weight of 7000 to 18000 D;
   a molecular weight distribution of 25 to 50;
   $MFR_{21}$ of 3 to 8 g/10 minutes;
   tensile modulus of at least 900 MPa; and
   a comonomer content of 1 to 2 wt %.

2. A process as claimed in claim 1 wherein said bimodal HDPE has a density of 945 to 960 kg/m³ and a weight average molecular weight of 250000 to 350000 D.

3. A blow moulded bimodal HDPE container having a volume of at least 8 L and an ESCR $F_{50}$ of at least 1000 hours wherein said bimodal HDPE consists of, as the polymer component of the container, an ethylene homopolymer having a weight average molecular weight of 40,000 to 100,000 D and ethylene copolymer and has the following characteristics:

a density of 940 to 960 kg/m$^3$;
a weight average molecular weight of 200000 to 450000 D;
a number average molecular weight of 7000 to 18000 D;
a molecular weight distribution of 25 to 50;
$MFR_{21}$ of 3 to 8 g/10 minutes;
tensile modulus of at least 900 MPa; and
a comonomer content of 1 to 2 wt %.

* * * * *